United States Patent [19]

Uhler

[11] 4,076,195

[45] Feb. 28, 1978

[54] ADJUSTABLE MOUNTING ASSEMBLY

[75] Inventor: Douglas Lester Uhler, Painesville, Ohio

[73] Assignee: Towmotor Corporation, Mentor, Ohio

[21] Appl. No.: 798,955

[22] Filed: May 20, 1977

[51] Int. Cl.² .................. F16M 5/00; F16F 15/00
[52] U.S. Cl. ........................... 248/9; 248/16; 248/274
[58] Field of Search .............. 248/9, 16, 15, 23, 22, 248/24, 358 R, 274, 70

[56] References Cited

U.S. PATENT DOCUMENTS

| | | | |
|---|---|---|---|
| 2,510,680 | 6/1950 | Byrnes | 248/23 |
| 2,595,637 | 5/1952 | Byrnes | 248/23 |
| 2,640,367 | 6/1953 | Rieser | 248/23 X |
| 2,893,722 | 7/1959 | Beck | 248/22 X |
| 2,923,146 | 2/1960 | Mayer | 248/23 X |
| 2,952,946 | 9/1960 | Lucas | 248/23 X |
| 3,023,990 | 3/1962 | Gunthel | 248/70 |
| 3,357,661 | 12/1967 | Aakjar | 248/23 |
| 3,432,705 | 3/1969 | Lindtveit | 248/16 |
| 3,449,883 | 6/1969 | Skubic et al. | 248/23 X |
| 3,532,319 | 10/1970 | Brown | 248/358 R |

Primary Examiner—J. Franklin Foss
Attorney, Agent, or Firm—Charles E. Lanchantin, Jr.

[57] ABSTRACT

An adjustable mounting assembly includes a supporting member having a load bearing surface and an anchoring element extending outwardly from said surface, a variably positioned member having an opening and a plurality of threaded passages, the opening having an axis and a size for fitting over the anchoring element, the threaded passages being spaced equidistantly from the axis, and the variably positioned member being supported by the load bearing surface, a mounting plate having an aperture and a plurality of bores, the bores defining a common geometric center, the aperture being eccentrically offset from the geometric center and having a size for fitting closely over the anchoring element, the mounting plate being rotatable about the anchoring element for aligning the bores with the threaded passages, and a plurality of retaining elements for insertion through the bores, screw threading into the threaded passages, clamping the mounting plate to the variably positioned member, and positively aligning the variably positioned member on the supporting member.

10 Claims, 2 Drawing Figures

ADJUSTABLE MOUNTING ASSEMBLY

BACKGROUND OF THE INVENTION

This invention relates generally to an adjustable mounting assembly, and more particularly to a mounting assembly having an eccentric plate for alignably locking a first member supportingly on a second member.

Heretofor, a plurality of mounting assemblies have been disposed at the various corners of an engine for mounting of the engine on a support frame. Such mounting assemblies have been adjustable in order to align the engine with the drive shaft or related accessories. This has been accomplished by providing oversized diameter holes relative to the diameter of the screw threaded retaining members or bolts passing through the holes.

However, the oversized hole technique is generally limited in the amount of misalignment permitted. Furthermore, if the oversized holes become too large, the heads of the bolts do not make proper load bearing engagement with the mounting members. For example, the heads of the retaining bolts may overlap the member only through a small arcuate portion around the hole, since the bodies of the bolts are eccentrically positioned within the hole.

SUMMARY OF THE INVENTION

The present invention is directed to overcoming one or more of the problems as set forth above.

According to the present invention this is accomplished by providing an adjustable mounting assembly including a supporting member having a load bearing surface and an anchoring element extending outwardly from said surface, a variably positioned member having an opening and a plurality of threaded passages, the opening having an axis and a size for fitting over the anchoring element, the threaded passages being spaced equidistantly from the axis, and the variably positioned member being supported by the load bearing surface, a mounting plate having an aperture and a plurality of bores, the bores defining a common geometric center, the aperture being eccentrically offset from the geometric center and having a size for fitting closely over the anchoring element, the mounting plate being rotatable about the anchoring element for aligning the bores with the threaded passages, and a plurality of retaining elements for insertion through the bores, screw threading into the threaded passages, clamping the mounting plate to the variably positioned member, and positively aligning the variably positioned member on the supporting member.

DETAILED DESCRIPTION

Figure 1:
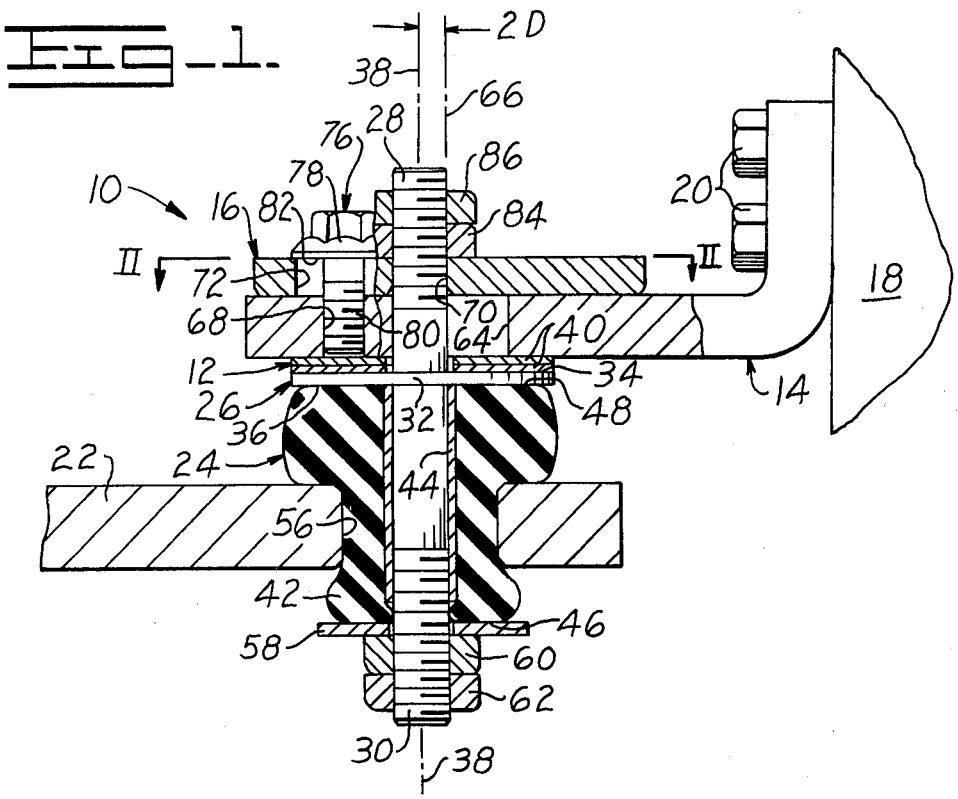
FIG. 1 is a diagrammatic section view through an adjustable mounting assembly constructed in accordance with the present invention.

Referring to FIG. 1, an adjustable mounting assembly 10 constructed in accordance with the present invention has a supporting means 12, a variably positioned member or bracket 14 generally mounted on the supporting means, and a mounting plate 16 used to clamp them together. In the instant example, the bracket 14 is removably secured to an engine 18 by a plurality of bolts 20, and the supporting means 12 is preferably connected to a vehicle frame element 22 through a resilient mount assembly 24. Although only one adjustable mounting assembly is shown in the drawings, it is to be appreciated that preferably two or more of the subject mounting assemblies would be used in the usual vehicle engine suspension arrangement.

More particularly, the supporting means 12 is seen to include a stud assembly 26 having an upper threaded stud portion or anchoring element 28, a lower threaded stud portion 30, and an integral support plate 32 located between the stud portions. In the instant example, the support plate has an upper load bearing surface 34 and a lower load bearing surface 36, which surfaces are arranged in parallel planes disposed at right angles to a common axis 38 of the aligned stud portions. Furthermore, the supporting means preferably includes one or more shims 40 which are seated on the upper load bearing surface in order to provide an elevationally adjustable surface on which the engine mounting bracket 14 is seated.

Advantageously, the supporting means 12 is flexibly supported by the resilient mount assembly 24 to minimize the transmission of shocks loads and metal-to-metal noise between the vehicle frame element 22 and the engine mounting bracket 14. For that purpose the resilient mount assembly includes a stepped cylindrical elastic pad 42 of elastomeric or rubber material with a tubular metal sleeve 44 bonded thereto. It is of note to recognize that the sleeve is foreshortened relative to the distance between the opposite end surfaces 46 and 48 of the elastic pad in the free or uncompressed condition thereof. It is apparent from viewing FIG. 1 that the pad has an upper cylindrical surface 50, a lower cylindrical surface 52, and a downwardly facing annular shoulder 54 disposed therebetween. With such construction the lower cylindrical surface of the pad is insertably installed in an opening 56 in the frame element 22 so that the shoulder thereof is seated on the frame element. The stud assembly 26 is mounted on the elastic pad such that the lower surface 36 of the support plate 32 bears against the upper end surface 48, and the lower stud portion 30 depends through the sleeve 44 and outwardly below it when viewing FIG. 1. An annular metal washer 58 is mounted on the lower stud portion and makes engagement with the lower end surface 46 of the pad, and a nut 60 and a lock nut 52 are screw threadably installed on the lower stud portion lockingly against the washer. It is contemplated that the nut 60 be preferably tightened to a preselected level of torque in order to compress the pad between the support plate 32 and washer 58. Such precompression serves to better retain the pad in the opening 56 of the frame element 22, and provides a preselected degree of resiliency or stiffness in the resilient mount assembly. Advantageously, such construction not only provides for a preselected amount of movement of the support means 12 in a lateral direction, but also for a preselected amount of movement thereof in a vertical direction.

Figure 2:
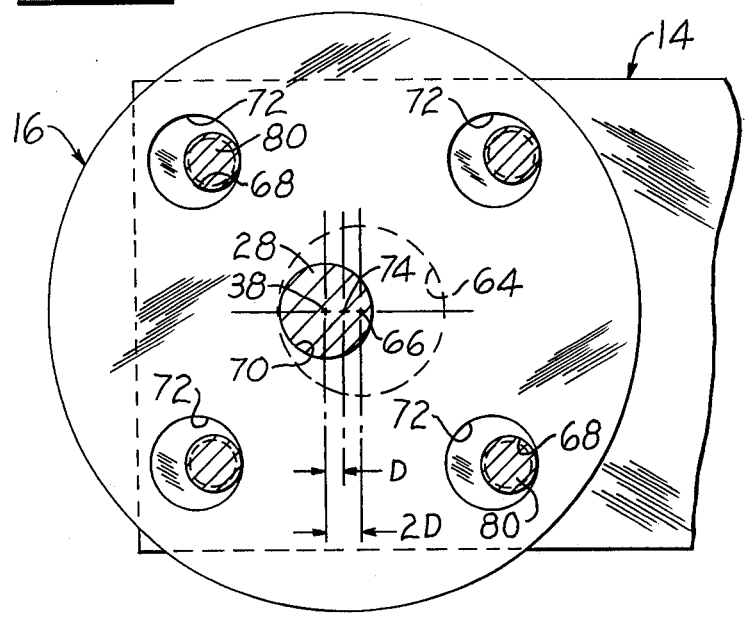
FIG. 2 is a diagrammatic and enlarged sectional plan view taken through the adjustable mounting assembly of the present invention as taken along line II—II of FIG. 1.

Turning now to the construction of the engine mounting bracket 14, shown also in FIG. 2 beneath the mounting plate 16, it will be seen that it has a central opening or cylindrical bore 64 having an axis 66, and a plurality of threaded passages 68 spaced equidistantly from the axis 66. It is to be recognized that the central opening in the mounting bracket is oversize in diameter relative to the upstanding anchoring element 28 or otherwise of a size sufficient for freely fitting over the anchoring element, whereupon the mounting bracket is supported by the shims 40 and the load bearing surface 34 of the supporting means 12.

In accordance with one of the main features of the present invention, the mounting plate 16 has a cylindrical aperture 70 having a diameter for closely fitting over the upstanding anchoring element 28 so that the axis of the aperture and the axis 38 of the supporting means are substantially coincident or aligned. Further, the mounting plate has a plurality of cylindrical bores 72 therethrough. These bores are arranged peripherally around the aperture 70, but advantageously have a common geometric center or axis 74, as best shown in FIG. 2, which geometric center is offset a preselected distance D from the axis 38 or from the center of the aperture 70 as indicated on the drawing.

A plurality of threaded retaining elements or screws 76, only one of which is shown in FIG. 1 for illustrative convenience, are utilized to lockingly clamp the mounting plate 16 against the engine mounting bracket 14. Such screws are preferably of conventional construction, having a head 78, a threaded body 80 and a load bearing shoulder 82 therebetween. The screws are of a construction for insertion through the bores 72 in the mounting plate, for screw threading engagement into the threaded passages 68 in the engine mounting bracket, and for load bearing engagement of the screw shoulders 82 against the mounting plate. This allows accurate and positive positioning of the engine 18 relative to the frame elements 22.

Another retaining element nut 84 and associated lock nut 86 are screw threadably received on the upstanding anchoring element 28 to positively vertically clamp the mounting plate 16 and engine mounting bracket 14 securely to the supporting means 12.

In operation, the engine 18 and the associated mounting brackets 14 are lowered over the supporting means 12 so that the threaded anchoring elements 28 extend upwardly through the oversized central bores 64 in the brackets. In this position the engine can be shifted or positioned to best align with the drive line or engine accessories, not shown. Once this position is established the engine mounting plates 16 are lowered over the anchoring elements, whereupon the individual mounting plates may be manually rotated for best visual alignment of the bores 72 with the threaded passages 68 in the brackets. In the instant example because of the eccentric offset distance D between the axes 38 and 74, the relationship of the diameters of the anchoring elements 28 and the bores 64, and also the use of four screws 76 in the various quadrants, the axes 38 can be spaced away from the axes 66 a distance of about 2D in the 12, 3, 6 and 9 o'clock positions when viewing FIG. 2.

After rotating the mounting plates 16 to their various individual positions, the screws 76 are inserted through the bores 72 and screw threadably engaged in the passages 68. This enables the shoulders 82 of the screws to clamp the plates tightly to their respectively associated engine mounting brackets 14. The nuts 84 are then screw threadably installed over the anchoring elements 28 in order to clamp the brackets and plates securely and positively to the support means 12 in the vertically direction.

Other objects, aspects and advantages will become apparent from a study of the specification, drawings and appended claims.

The embodiments of the invention in which an exclusive property or privilege is claimed are defined as follows:

1. An adjustable mounting assembly comprising:
   a supporting member having a load bearing surface and an anchoring element;
   a variably positioned member having an opening and a plurality of threaded passages, said opening having an axis and being of a size sufficient for freely fitting over said anchoring element, said threaded passages being spaced a substantially equidistance from said axis, and said variably positioned member being supported by said load bearing surface;
   a mounting plate having an aperture and a plurality of bores, said bores defining a common geometric center, said aperture being eccentrically offset from said geometric center and of a construction sufficient for fitting closely over said anchoring element, said mounting plate being rotatable about said anchoring element for aligning said bores with said threaded passages; and
   a plurality of retaining elements being of a construction sufficient for insertion through said bores, screw threading into said threaded passages, aligning said variably positioned member on said supporting member, and clamping said mounting plate to said variably positioned member.

2. The adjustable mounting assembly of claim 1 including a second retaining element, said second retaining element being of a construction for engaging said anchoring element and clamping said mounting plate and said variably positioned member as a unit against said load bearing surface of said supporting member.

3. The adjustable mounting assembly of claim 2 wherein said anchoring element is a threaded member and said second retaining element is a nut threaded on said threaded member.

4. The adjustable mounting assembly of claim 1 including a frame element and a resilient mount assembly connected to said frame element, said resilient mount assembly being of a construction for resiliently supporting said supporting member on said frame element.

5. The adjustable mounting assembly of claim 4 wherein said supporting member includes a threaded stud axially aligned with said anchoring element, said threaded stud being connected to said resilient mount assembly.

6. The adjustable mounting assembly of claim 1 wherein said variably positioned member is an engine mounting bracket.

7. The adjustable mounting assembly of claim 1 wherein said retaining elements are screws, each of said screws having a head, a threaded body and an annular shoulder.

8. The adjustable mounting assembly of claim 7 wherein said anchoring element is a threaded member, and said mounting assembly includes a nut threaded on said threaded member and urging said mounting plate and said variably positioned member toward said supporting member.

9. The adjustable mounting assembly of claim 8 including a vehicle frame element and resilient mount assembly connected to said frame element, said resilient mount assembly being of a construction sufficient for resiliently supporting said supporting member.

10. The adjustable mounting assembly of claim 9 wherein said resilient mount assembly includes a stepped cylindrical elastic pad.

* * * * *